(12) United States Patent
Hasegawa et al.

(10) Patent No.: US 6,780,066 B2
(45) Date of Patent: Aug. 24, 2004

(54) ARC DISCHARGE PREVENTING DEVICE

(75) Inventors: Tetsuya Hasegawa, Susono (JP); Yasuhiro Tamai, Susono (JP); Takashi Gohara, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/390,923

(22) Filed: Mar. 19, 2003

(65) Prior Publication Data
US 2003/0178949 A1 Sep. 25, 2003

(30) Foreign Application Priority Data

Mar. 20, 2002 (JP) ..................................... P2002-078160

(51) Int. Cl.[7] .............................................. H01R 24/00
(52) U.S. Cl. ..................... 439/732; 439/709; 439/181; 361/657; 361/212; 361/667; 307/147; 307/10.7
(58) Field of Search ................................ 439/732, 709, 439/181, 76.2; 307/147, 10.7, 9.1, 18, 48; 361/212, 657, 667, 641; 174/173, 174, 176; 320/104, 107; 318/139; 315/310, 324

(56) References Cited

U.S. PATENT DOCUMENTS 6,261,123 B1  7/2001 Kruger et al.
6,603,283 B2 * 8/2003 Yuasa et al. ................. 320/104
6,623,288 B2 * 9/2003 Sakiyama et al. ........... 439/181
6,642,633 B1 * 11/2003 Yang ........................... 307/147
6,650,087 B2 * 11/2003 Yuasa et al. ................. 320/107

FOREIGN PATENT DOCUMENTS

JP         9-223439      8/1997
JP    2002343331 A  * 11/2002     ............ H01M/2/20

* cited by examiner

Primary Examiner—Haissa Philogene
(74) Attorney, Agent, or Firm—Sughrue Mion, PLLC

(57) ABSTRACT

An arc discharge preventing device is electrically connected to at least two electronic devices, the arc discharge preventing device. The arc discharge preventing device includes an insulating main body, a first terminal, a second terminal, a low conductive member, and a conductive member. The first terminal is provided on the insulating main body, and electrically connected to a first electronic device. The second terminal is provided on the insulating main body, and electrically connected to a second electronic device. The low conductive member is provided on the insulating main body, and having a first resistance value. The low conductive member is electrically connected to the first and second terminals. The conductive member is detachably mounted on the insulating main body, and having a second resistance value lower than the first resistance value. The conductive member is electrically connected to the first and second terminals when the conductive member is attached to the insulating main body.

2 Claims, 13 Drawing Sheets

ARC DISCHARGE PREVENTING DEVICE

BACKGROUND OF THE INVENTION

The present invention relates to an arc discharge preventing device, which is installed between a battery and a DC/DC converter which are mounted on a moving body, such as a vehicle.

A vehicle as a moving body is installed with bus bars contained in electrical connection boxes, such as junction boxes, relay boxes and fuse boxes, electrical connection terminals, and many power transmission lines for transmitting electric powers and signals.

Generally, in general passenger vehicles, voltage of electric power transmitted through the power transmission line is 14V (effective voltage), and in large vehicles, such as buses and tracks, the power voltage is 28V (effective voltage) (=14×2). Particularly, in large vehicles, there is an approach of using the power supply system capable of supplying electric powers of multiple voltages, not the single voltage, under the requirements of improving the driving efficiency of the loads and securing the optimum efficiency of each load. Further, in the electric cars and fuel cell vehicles, there is an approach of using the power supply system capable of supplying electric powers of multiple voltages, not the single voltage, under the requirements of improving the driving efficiency of the loads and securing the optimum efficiency of each load.

More exactly, the most practical way under consideration is to employ a power supply system in which a power voltage is 14V (effective voltage) as in the related case, and a high power voltage is 42V (effective voltage) as the maximum voltage which does not require great alteration of the transmission system specifications.

An example of a power supply system 101 capable of supplying electric powers of multiple of voltages is shown in FIG. 13. The power supply system 101 uses a high voltage battery 102 as a main power source. The high voltage battery 102 supplies electric power to a high voltage load 103 which needs high voltage power. The power source system 101 includes a DC/DC converter 104 for converting electric power of 42V to electric power of 14V. The DC/DC converter 104 is connected to a low voltage load 105 which requires electric power of low voltage. The high voltage battery 102, the high voltage load 103, the DC/DC converter 104 and the low voltage load 105 form electronic devices, respectively.

In the power source system 101, when the loads 103, 105 are operated, in particular when an electric wire is connected to or disconnected from the terminal of the high voltage battery 102, arc discharge often occurs at, for example, a connection part between the terminal and the electric wire.

If the DC/DC converter 104 is once operated, charge is stored in the capacitors or the like in the DC/DC converter 104. As a status of the high voltage battery 102 is closer to an empty state, there is an increased chance that the arc discharge occurs at the connection part between the terminal and the electric wire or the like when the electric wire is connected to the terminal of the high voltage battery 102.

If the DC/DC converter 104 is left not operated for a long period, the charge stored in the capacitor contained in the DC/DC converter is gradually discharged. In this case, as the status of the high voltage battery 102 is closer to the full charged state, there is an increased chance that the arc discharge occurs at the connection part between the terminal and the electric wire or the like when the electric wire is connected to the terminal of the high voltage battery 102, increases. Thus, in the power source system 101, there is a fear that the arc discharge occurs when the electronic devices are electrically connected or the electrically interconnected electronic devices are disconnected one from the other.

SUMMARY OF THE INVENTION

It is therefore an object of the present invention to provide an arc discharge preventing device, which is capable of preventing the arc discharge from occurring when the electronic devices are electrically interconnected or the electrically interconnected electronic devices are disconnected one from the other.

In order to achieve the above object, according to the present invention, there is provided an arc discharge preventing device, which is electrically connected to at least two electronic devices, the arc discharge preventing device, comprising:

an insulating main body;
a first terminal, provided on the insulating main body, and electrically connected to a first electronic device;
a second terminal, provided on the insulating main body, and electrically connected to a second electronic device;
a low conductive member, provided on the insulating main body, and having a first resistance value, the low conductive member being electrically connected to the first and second terminals; and
a conductive member, detachably mounted on the insulating main body, and having a second resistance value lower than the first resistance value, the conductive member being electrically connected to the first and second terminals when the conductive member is attached to the insulating main body.

In the above configuration, the first terminal is connected to a first electronic device, the second terminal is connected to the second electronic device, and in this connection state, electric power is made to flow through a path between the electronic devices. At this time, the electric power flows mainly through a conductive member in the path between the electronic devices. Accordingly, if the conductive member is attached to the main body part, the electric power may be made to flow through the path between the electronic devices.

The conductive member is removed from the main body in a state that the first terminal is connected to the first electronic device, the second terminal is connected to the second electronic device, and electric power is made to flow through a path between the electronic devices. In this state, the electric power which flows through the path between the electronic devices flows through the low conductive member. A current value of the electric power flowing through the path between the electronic devices is small. Accordingly, no arc discharge occurs when the electrical wire is removed from the terminal of the electronic device. Further, no arc discharge occurs even when another conductive member comes in contact with the terminal of the electronic device.

One of the first and second terminals is connected to a DC/DC converter as an electronic device, and a conductive member is connected to another electronic device. In a state that the conductive member is connected to the main body, the DC/DC converter is operated even once. When the conductive member is removed from the main body, charge stored in the DC/DC converter flows therefrom through the low conductive member. Accordingly, a current value of the electric power flowing through the path between the DC/DC converter 9 and another electronic device is small. No arc discharge occurs when the electrical wires are removed from the terminals of the DC/DC converter and others. No arc discharge occurs even if another conductive member comes in contact with the terminals of the DC/DC converter and others.

One of the first and second terminals is connected to the DC/DC converter as is left not operated for a long time in a state that the conductive member is removed from the main body part, and the other terminal is connected to a battery as an electronic device. In this connection state, the electric power supplied from the battery flows through the low conductive member to the DC/DC converter. Accordingly, a current value of the electric power flowing between the battery and the DC/DC converter is small.

Therefore, no arc discharge occurs when the terminal of the DC/DC converter is connected to the one terminal or when the battery terminal is connected to the other terminal. No arc discharge occurs when the electronic devices are interconnected or when the interconnected electronic devices are disconnected one from the other. In the arc discharge preventing device as broadly defined, the first terminal is connected to one of the electronic devices, the second terminal is connected to the other of the electronic devices, and in this connection state, electric power is made to flow through a path between the electronic devices. At this time, the electric power flows mainly through the conductive member, between the electronic devices. Accordingly, if the conductive member is attached to the main body, the electric power may be made to flow through the path between the electronic devices.

Preferably, the arc discharge preventing device further comprises an insulating second main body, detachably mounted on the main body, and on which the conductive member is mounted. The second main body is provided with a covering parts, which covers the first and second terminals in cooperation with the main body when the second main body is attached to the insulating main body so as to electrically connected the conductive member and the first and second terminals.

In the above configuration, the second main body includes covering parts. With provision of the second main body, in a state that the conductive member is electrically connected to the first and second terminals, another conductive member never comes in contact with those terminals. This feature eliminates a chance that when the electric power is flowing through the conductive member between the terminals, another conductive member comes in contact with those terminals. No arc discharge occurs at those terminals and the another conductive member when the electronic devices are electrically interconnected, or when those electronic devices electrically interconnected are disconnected one from the other.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

An arc discharge preventing device of a first embodiment according to the present invention will be described with reference to FIGS. 1 through 7. An arc discharge preventing device 1 shown in FIG. 1, for example, is used in a power supply system 2 shown in FIG. 7. The power supply system 2 shown in FIG. 7 is used for a vehicle as a moving body, such as the electric car or the fuel cell vehicle.

Figure 7:
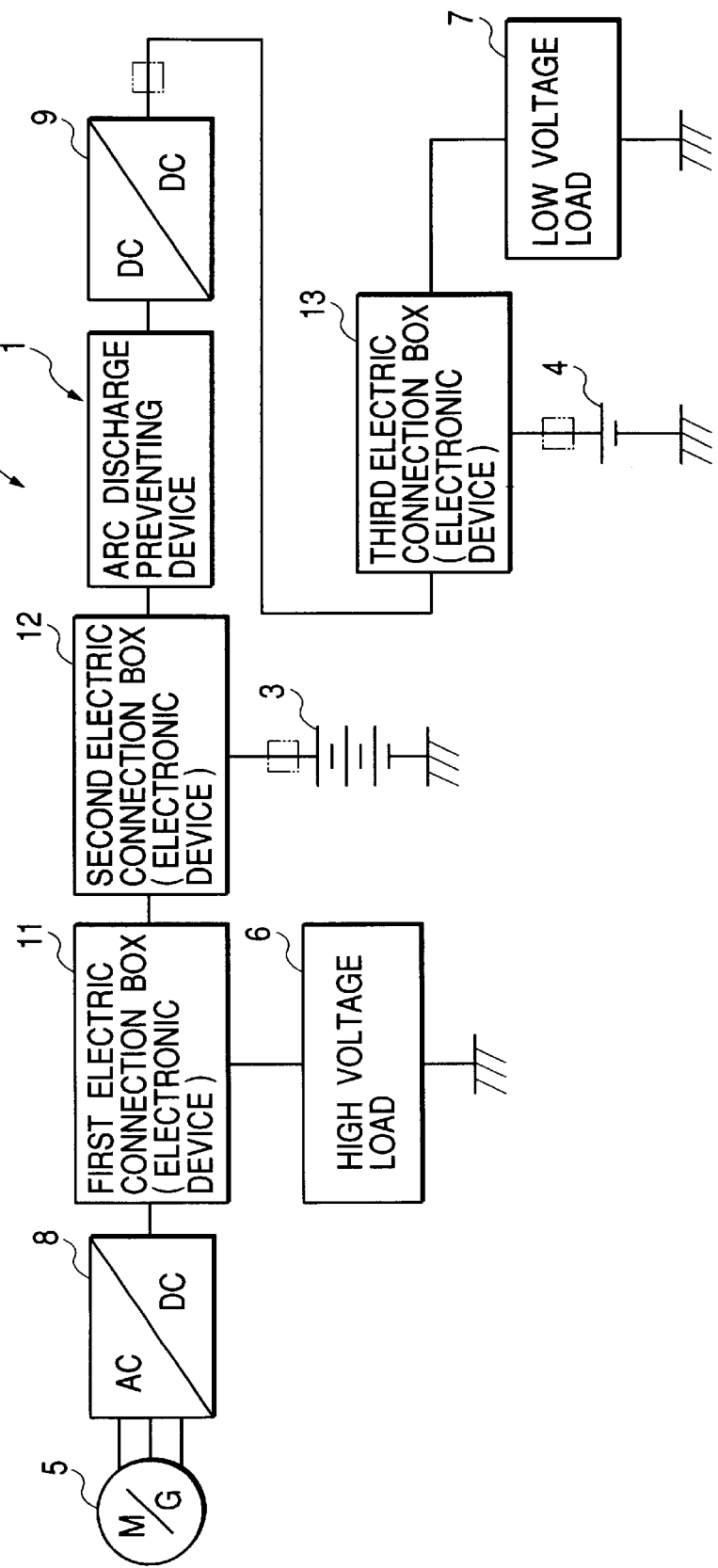
FIG. 7 is a block diagram showing a power supply system using the arc discharge preventing device shown in FIG. 1.
Figure 8:
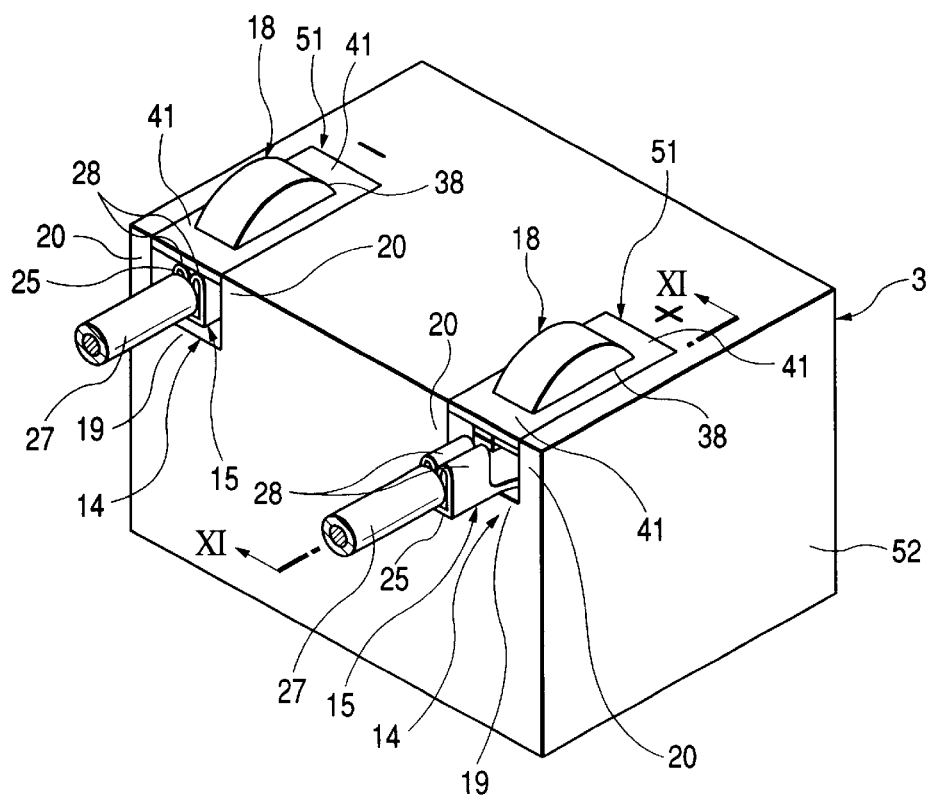
FIG. 8 is a perspective view showing an arc discharge preventing device of a second embodiment according to the present invention.

In the power supply system 2 shown in FIG. 7, a high voltage battery 3 of 42V in effective voltage is used as a main power source, and a low voltage battery 4 of 14V in effective voltage is used as a sub power source. The power supply system 2 supplies electric power to a motor generator (MG) 5 for driving the vehicle to run, whereby the MG 5 is driven to run. The power supply system 2 supplies electric power to the high voltage load 6, which requires high voltage power. The low voltage battery 4 supplies electric power to the low voltage load 7, which requires low voltage power. In the power supply system 2, electric power generated by the MG 5 is supplied to the high voltage battery 3 and the low voltage battery 4 to charge them, and to the high voltage load 6 and the low voltage load 7 to driving the same.

The power supply system 2 is made up of an AC/DC converter 8, DC/DC converter 9, first electric connection box 11, second electrical connection box 12, third electrical connection box 13, and arc discharge preventing device 1 forming the first embodiment of the invention. The AC/DC converter 8 is electrically connected at the AC side to the MG 5. The AC/DC converter 8 converts DC power received from the high voltage battery 3, for example, to AC power, and supplies the converted one to the MG 5 to drive the same. The AC/DC converter 8 converts AC power received from the MG 5 to DC power, and supplies the converted one to the batteries 3 and 4, and the loads 6 and 7, by way of the first electric connection box 11.

The DC/DC converter 9 includes known capacitors, and is connected to the positive polarity of the high voltage battery 3 and the negative polarity of the low voltage battery 4. Accordingly, when the DC/DC converter 9 is once operated, electric charge is stored in the capacitors. When the DC/DC converter 9 is left not operated for a long time, the charge is gradually discharged from the capacitors.

The DC/DC converter 9 converts high voltage power, which is received from the high voltage battery 3 or MG 5, into low voltage power, and supplies the converted one to the low voltage battery 4 and the low voltage load 7 by way of the third electrical connection box 13. The DC/DC converter 9 converts low voltage power received from the low voltage battery 4 to high voltage power, and supplies the converted one to the high voltage battery 3 and the high voltage load 6 by way of the second electrical connection box 12.

The first electric connection box 11 is connected to the AC/DC converter 8, second electrical connection box 12 and high voltage load 6. The first electric connection box 11 relays electric power among the AC/DC converter 8, second electrical connection box 12 and high voltage load 6, in accordance with predetermined patterns.

The second electrical connection box 12 is connected to the first electric connection box 11, high voltage battery 3 and DC/DC converter 9. The second electrical connection box 12 relays electric power among the first electric connection box 11, high voltage battery 3 and DC/DC converter 9, in accordance with predetermined patterns.

The third electrical connection box 13 is connected to the DC/DC converter 9, low voltage battery 4 and low voltage load 7. The third electrical connection box 13 relays electric power among the DC/DC converter 9, low voltage battery 4 and low voltage load 7, in accordance with predetermined patterns. The first to third electric connection boxes 11 to 13, high voltage battery 3, low voltage battery 4 and DC/DC converter 9 form electronic devices referred to in the present specification.

The arc discharge preventing device 1 is provided between the second electrical connection box 12 and the DC/DC converter 9, and electrically interconnects them. Thus, the arc discharge preventing device 1 is provided between the second electrical connection box 12 and DC/DC converter 9. The arc discharge preventing device 1 prevents arc discharge from occurring between the high voltage battery 3 and the DC/DC converter 9 since the second electrical connection box 12 is connected to the high voltage battery 3.

Figure 1:
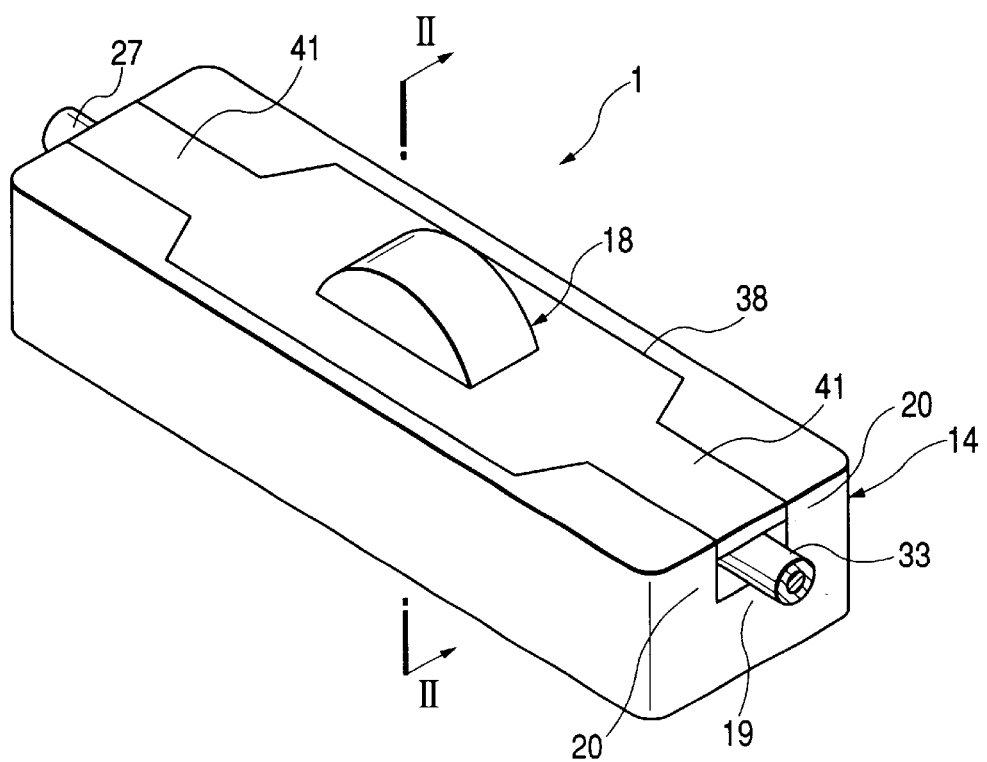
FIG. 1 is a perspective view showing an arc discharge preventing device of a first embodiment according to the present invention.
Figure 2:
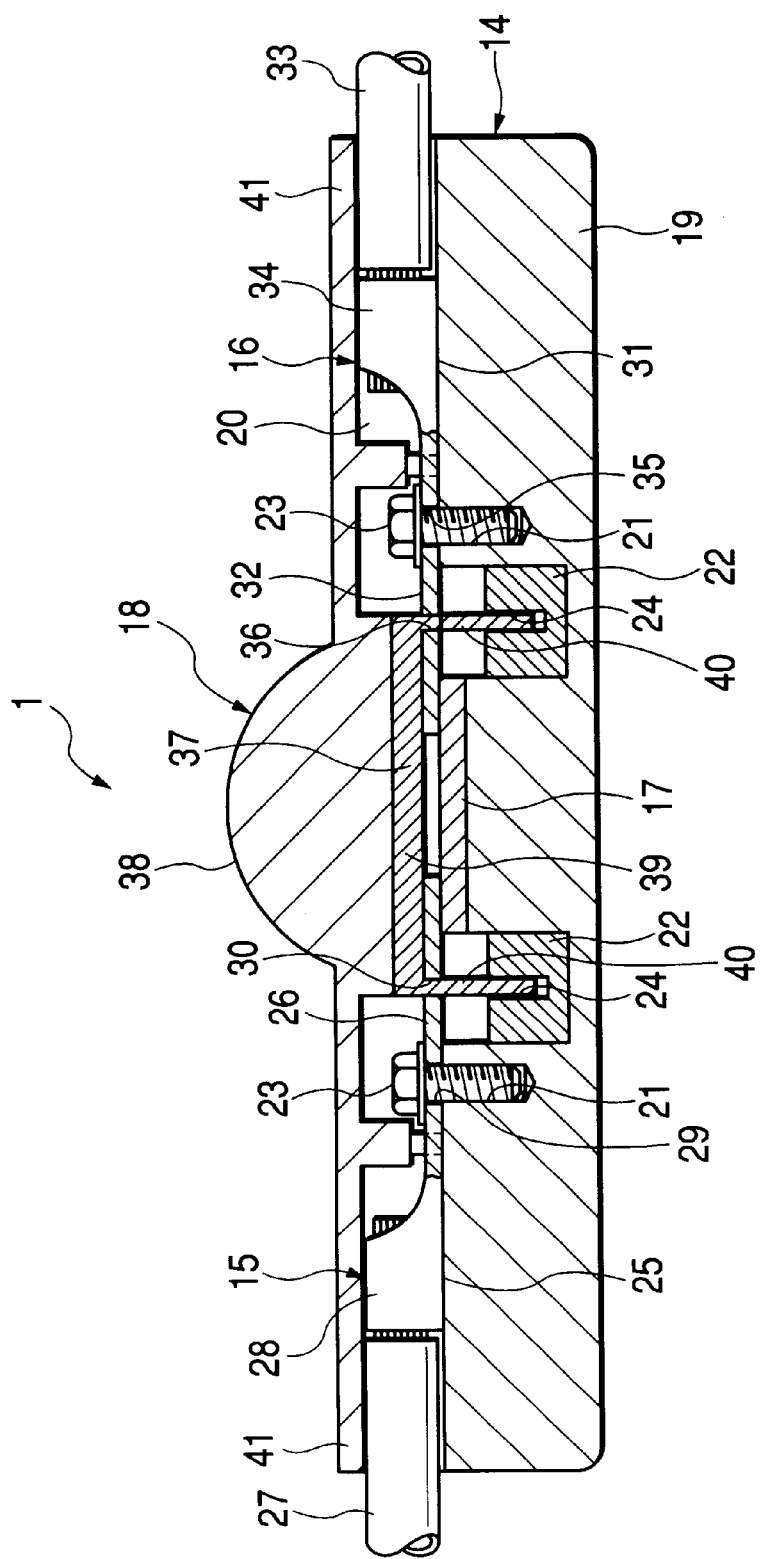
FIG. 2 is a cross sectional view taken on line II—II in FIG. 1.
Figure 3:
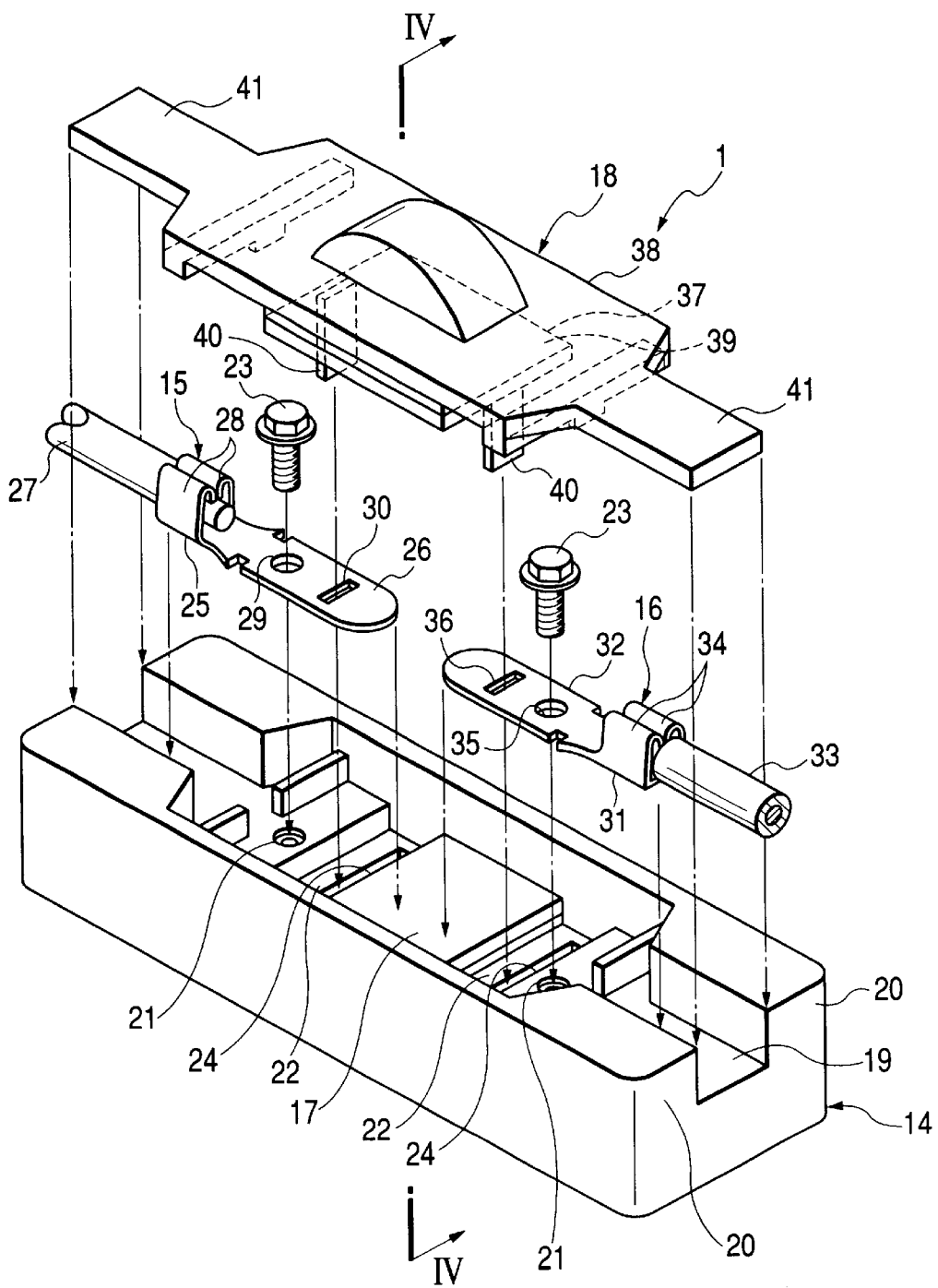
FIG. 3 is a perspective view showing, in exploded form, the arc discharge preventing device shown in FIG. 1.

As shown in FIGS. 1 through 6, the arc discharge preventing device 1 includes a main body part 14 made of insulating synthetic resin, first terminal 15 (FIGS. 2 to 6), second terminal 16 (FIGS. 2 to 6), third terminal 17 (FIGS. 2 to 6), and a service plug 18. The main body part 14, as shown in FIG. 3, for example, includes a bottom wall 19, substantially flat, and a couple of peripheral walls 20. The bottom wall 19 of the main body part 14 is rectangular in plan configuration. The peripheral walls 20 stand erect from both edges of the bottom wall 19 as viewed in the width direction. The couple of peripheral walls 20 are parallel to each other, and spaced from each other.

As shown in FIG. 2, for example, the bottom wall 19 includes a couple of screw holes 21 and a couple of conductive members 22. The screw holes 21 are opened in the surface of the bottom wall 19. Those screw holes 21 are arranged in the longitudinal direction of the bottom wall 19, and spaced from each other. Bolts 23 are screwed into the screw holes 21, respectively.

The couple of conductive members 22 are made of conductive metal, for example. The conductive members 22 are buried in the bottom wall 19, and exposed to the surface side of the bottom wall 19. The conductive members 22 are arranged in the longitudinal direction of the bottom wall 19 while spaced from each other, and disposed at positions closer to the center than the screw holes 21. Recesses 24 into which connection pieces 40 of a conductive member 37 to be given later are to be inserted are provided in the conductive members 22, respectively. The recesses 24 are opened to the surface side of the bottom wall 19.

The first terminal 15 is formed with a conductive metal plate, and includes a wire connection part 25 and an electrical contact part 26, which are integral with the first terminal. The wire connection part 25 includes a plurality of caulking pieces 28 for caulking an electrical wire 27. The first terminal 15 is electrically connected to the second electrical connection box 12 by the electrical wire 27 caulked by the caulking pieces 28 of the wire connection part 25.

The electrical contact part 26 is continuous to the wire connection part 25 and is shaped like a flat plate. A bolt passing hole 29 permitting a bolt to pass therethrough and a connection-piece passing hole 30 permitting the connection piece 40 of the conductive member 37 are formed passing through the electrical contact part 26. When the bolt passing hole 29 is aligned with one of the screw holes 21, the connection-piece passing hole 30 is aligned with one of the recesses 24. One bolt 23 is screwed into the related screw hole 21 through the bolts 23, and then the electrical contact part 26, i.e., the first terminal 15, is mounted on the main body part 14.

The second terminal 16 is formed with a conductive metal plate, and includes a wire connection part 31 and an electrical contact part 32, which are integral with the second terminal. The wire connection part 31 includes a plurality of caulking pieces 34 for caulking an electrical wire 33. The second terminal 16 is electrically connected to the DC/DC converter 9 by the electrical wire 33 caulked by the caulking pieces 34 of the wire connection part 31.

The electrical contact part 32 is continuous to the wire connection part 31 and is shaped like a flat plate. A bolt passing hole 35 permitting a bolt to pass therethrough and a connection-piece passing hole 36 permitting the connection piece 40 of the conductive member 37 are formed passing through the electrical contact part 32. When the bolt passing hole 35 is aligned with the other of the screw holes 21, the connection-piece passing hole 36 is aligned with the other of the recesses 24. One bolt 23 is screwed into the related screw hole 21 through the bolts 35, and then the electrical contact part 32, i.e., the second terminal 16, is mounted on the main body part 14.

The low conductive member 17 is made of resistive material, e.g., nichrome wire (Ni—Cr alloy) or carbon, and is shaped like a flat plate. Accordingly, electrical resistance of the low conductive member 17 is very high resistance. The low conductive member 17 is disposed at the central part of the bottom wall 19 as viewed in the longitudinal direction of the bottom wall 19, and mounted on the main body part 14.

The low conductive member 17 overlaps with the electrical contact part 26 of the first terminal 15 and the electrical contact part 32 of the second terminal 16. The electrical contact parts 26 and 32 are respectively fixed to the bottom wall 19, or the main body part 14, by the bolts 23. The low conductive member 17 electrically interconnects the first terminal 15 and the second terminal 16. The electrical contact part 26 of the first terminal 15 and the electrical contact part 32 of the second terminal 16, which overlap with the low conductive member 17, however, are not contact with each other.

As shown in FIG. 2, for example, the service plug 18 includes a conductive member 37, electrically conductive, and the second main body part 38, electrically insulative. The conductive member 37 is made of conductive metal, and includes a flat part 39 and the couple of connection pieces 40. The connection pieces 40, flat in shape, stand erect from the edges of the flat part 39. Those connection pieces 40 are spaced from each other and confronted with each other. Accordingly, the conductive member 37 is shaped like U when viewed from side.

The connection pieces 40 may be inserted into the recesses 24 of the conductive members 22 through the connection-piece passing holes 30 and 36. When the connection pieces 40 passed through the connection-piece passing holes 30 and 36, the flat part 39 overlaps with the electrical contact part 26 of the first terminal 15 fixed to the main body part 14 and the electrical contact part 32 of the second terminal 16. When the conductive member 37 is thus mounted on the main body part 14, the first terminal 15 and the second terminal 16 are electrically connected to each other.

The second main body part 38 is made of insulating synthetic resin and shaped to be flat. The second main body part 38 is rectangular in plan configuration. The second main body part 38 may be inserted into between the peripheral walls 20 of the main body part 14. The flat part 39 of the conductive member 37 is mounted at the central part of the second main body part 38 as viewed in the longitudinal direction thereof. The second main body part 38 is detachably inserted into the main body part 14. The conductive member 37 is detachably inserted into the main body part 14.

The second main body part 38 is provided with a couple of terminal covering parts 41. In this sense, the arc discharge preventing device 1 is also provided with a couple of terminal covering parts 41, as a matter of course. The terminal covering parts 41, shaped to be flat, are extended from both side edges of the second main body part 38 in the longitudinal directions of the second main body part. The terminal covering parts 41 may be inserted into the space between the peripheral walls 20 of the main body part 14. When the second main body part 38, i.e., the service plug 18, is mounted on the main body part 14, the terminal covering parts 41 is parallel to the surface of the bottom wall 19, and cooperates with the main body part 14 to cover the first terminal 15 and the second terminal 16.

In the thus constructed service plug 18, the connection pieces 40 of the conductive member 37 are respectively inserted into the recesses 24 of the conductive members 22 through the connection-piece passing holes 30 and 36. The flat part 39 overlaps with the electrical contact part 26 of the first terminal 15 and the electrical contact part 32 of the second terminal 16. And, the conductive member 37 interconnects the first terminal 15 and the second terminal 16. Further, the terminal covering parts 41 cooperates with he main body part 14 to cover the first terminal 15 and the second terminal 16. In this way, the service plug 18 is mounted on the main body part 14 to electrically interconnect the first terminal 15 and the second terminal 16.

Further, the connection pieces 40 of the conductive member 37 pass respectively through the connection-piece passing holes 30 and 36, and then through the recesses 24 of the conductive members 22. The service plug 18, i.e., the conductive member 37 and the second main body part 38, is detachably attached to the main body part 14.

Figure 4:
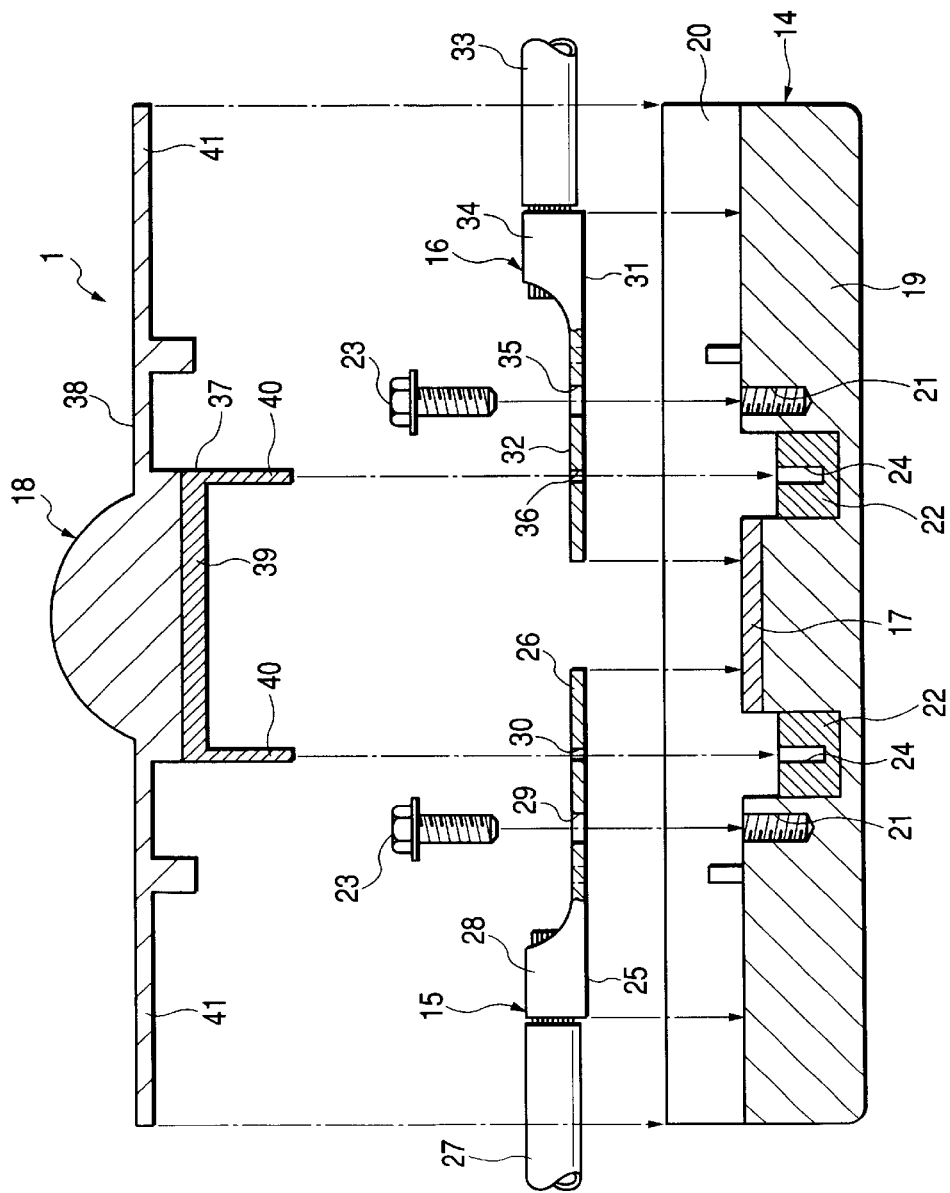
FIG. 4 is a cross sectional view taken on line IV—IV in FIG. 3.
Figure 5:
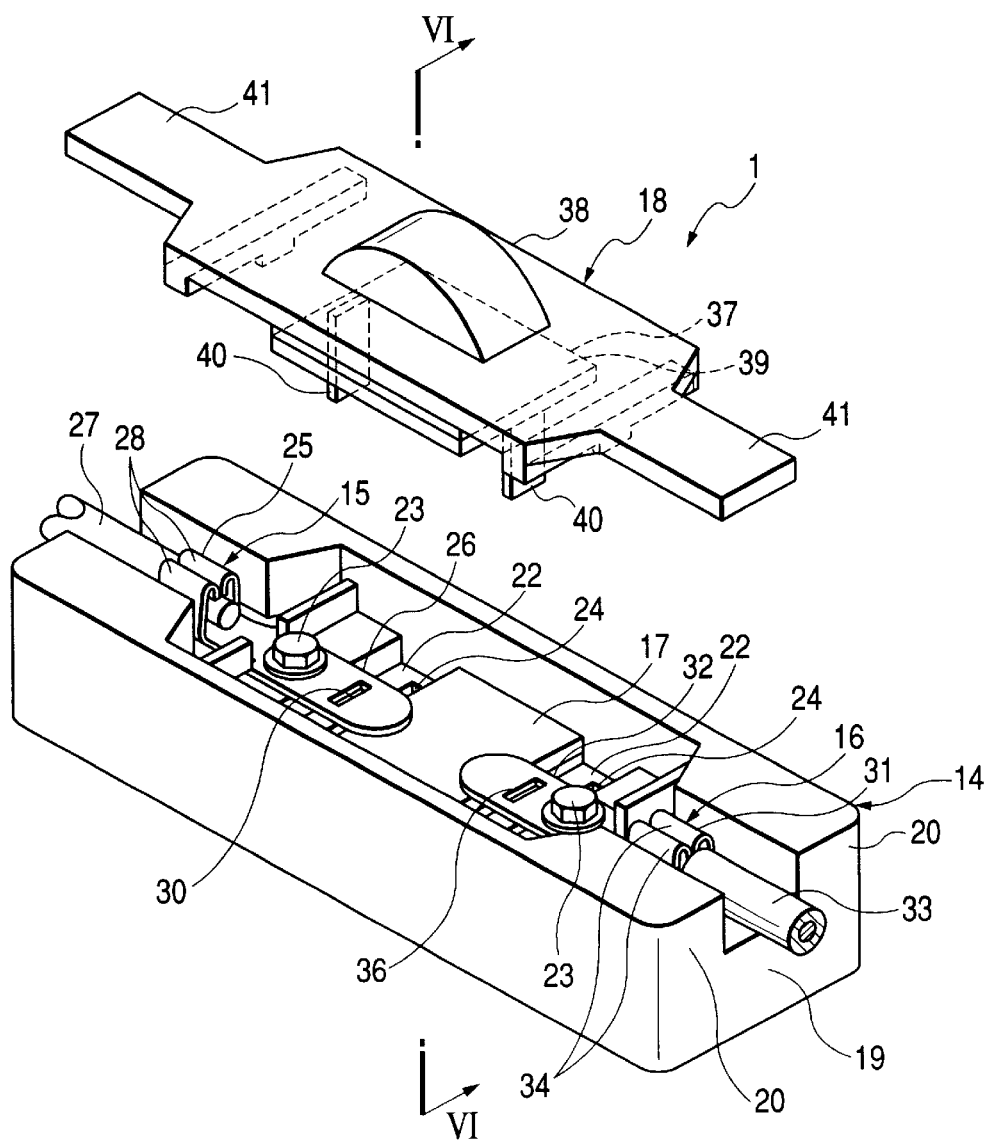
FIG. 5 is a perspective view showing a structure that first and second terminals are mounted on the main body part of the arc discharge preventing device shown in FIG. 3.
Figure 6:
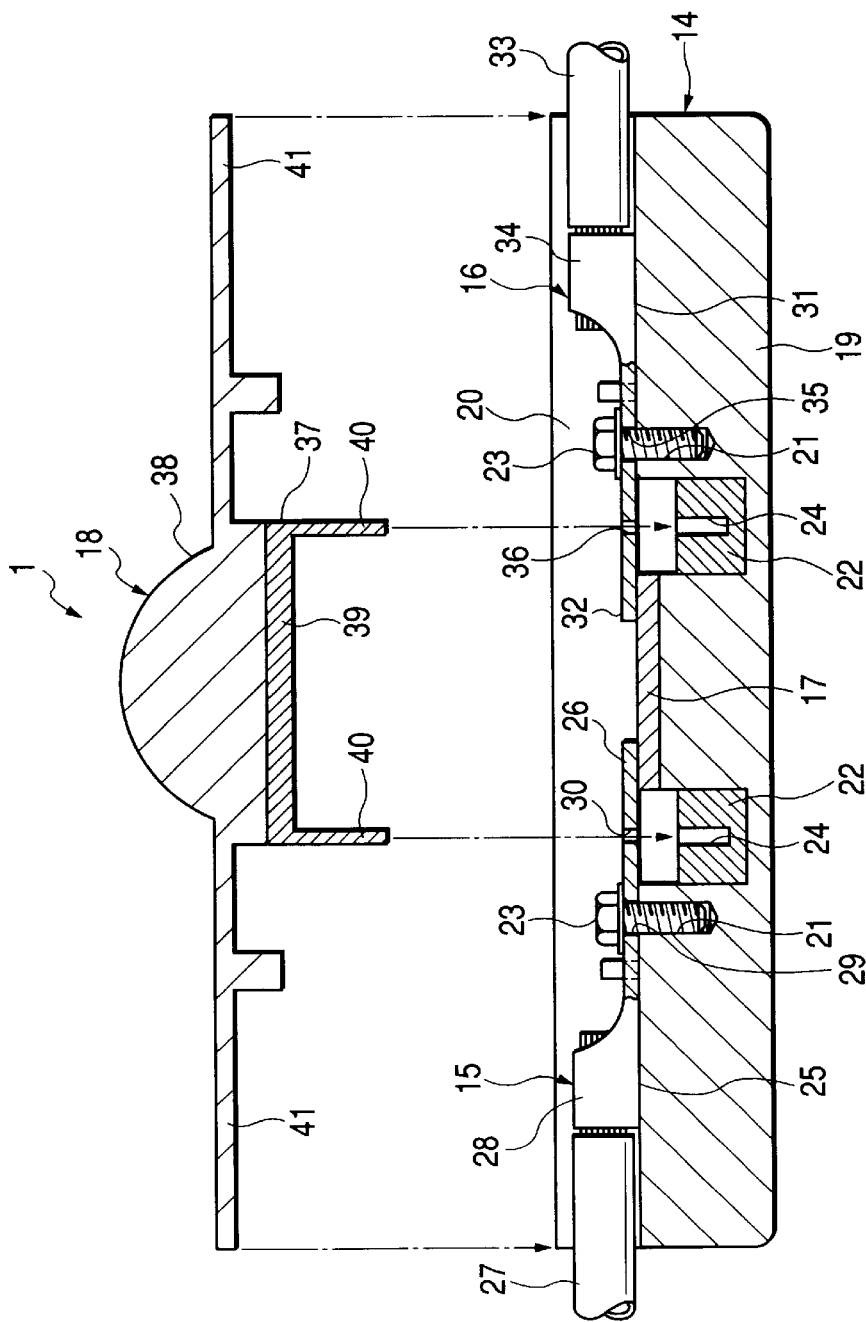
FIG. 6 is a cross sectional view taken on line VI—VI in FIG. 5.

To assemble the arc discharge preventing device 1 thus constructed, in a state of the structure shown in FIGS. 3 and 4, the first terminal 15 and the second terminal 16 are mounted on the main body part 14 as shown in FIGS. 5 and 6. Then, the service plug 18 is mounted on the main body part 14.

When the power supply system 2 drives the MG 5, high voltage load 6, low voltage load 7 and the like, the arc discharge preventing device 1 operates in the following way. The first terminal 15 is electrically connected to the second electrical connection box 12, and the second terminal 16 is electrically connected to the DC/DC converter 9. The service plug 18 is mounted on the main body part 14, the first terminal 15 and the second terminal 16 are electrically interconnected mainly through the conductive member 37. In this state, the arc discharge preventing device 1 reliably supplies electric power to the second electrical connection box 12 and the DC/DC converter 9.

When the service plug 18 is detached from the main body part 14 in a state that the power supply system 2 is driven, viz., the electric power is supplied to between the second electrical connection box 12 and the DC/DC converter 9, the first terminal 15 and the second terminal 16 are electrically interconnected through the low conductive member 17. And a current value of the electric power flowing through the path between the second electrical connection box 12 and the DC/DC converter 9 is small.

The service plug 18 is detached from the main body part 14 of the arc discharge preventing device 1 in a state that the DC/DC converter 9 is driven once, viz., charge is stored in the DC/DC converter 9. Then, the charge flows from the DC/DC converter 9 through the low conductive member 17. And a current value of the electric power flowing through the path between the second electrical connection box 12 and the DC/DC converter 9 is small.

In assembling the power supply system 2, before the second electrical connection box 12, which is electrically connected to the high voltage battery 3 and the like, is connected to the DC/DC converter 9 which is left not operated for a long time, viz., it does not store charge, by use of the arc discharge preventing device 1, the service plug 18 is detached from the main body part 14 in advance. Further, the first terminal 15 and the second terminal 16 are mounted on the main body part 14 in advance. The electrical wire 27 connected to the first terminal 15 is connected to the second electrical connection box 12, and the electrical wire 33 connected to the second terminal 16 is connected to the DC/DC converter 9.

The electric power that is supplied from the high voltage battery 3 to the arc discharge preventing device 1 through the second electrical connection box 12, flows to the DC/DC converter 9 through the low conductive member 17. In this state, a current value of the electric power flowing through the path between the second electrical connection box 12 and the DC/DC converter 9 is small.

In the instant embodiment, in a state that the power supply system 2 is being operated, viz., the first terminal 15 is connected to the second electrical connection box 12 and the second terminal 16 is connected to the DC/DC converter 9, the service plug 18 is attached to the main body part 14. In this state, the electric power flows through the conductive member 37 between the second electrical connection box 12 and the DC/DC converter 9. Accordingly, the electric power flow between the second electrical connection box 12 and the DC/DC converter 9 is ensured by attaching the service plug 18, or the conductive member 37, to the main body part 14.

The power supply system 2 is being operated, viz., the first terminal 15 is connected to the second electrical connection box 12 and the second terminal 16 is connected to the DC/DC converter 9, the service plug 18, i.e., the conductive member 37, is detached from the main body part 14. In turn, the electric power flows through the low conductive member 17, and in this case, a current value of the electric power flowing through the path between the second electrical connection box 12 and the DC/DC converter 9 is small.

For this reason, even in a state that the power supply system 2 is operated, no arc discharge occurs when the electrical wires 27 and 28 are removed from the terminals of the second electrical connection box 12 and the DC/DC converter 9, if the service plug 18 is detached from the main body part 14. No arc discharge occurs even if another conductive member comes in contact with the terminals of the second electrical connection box 12, the DC/DC converter 9 and others.

When the service plug 18, or the conductive member 37, is detached from the main body part 14 in a state that charge is stored in the DC/DC converter 9, the charge flows into the low conductive member 17. Accordingly, a current value of the electric power flowing through the path between the DC/DC converter 9 and the second electrical connection box 12 is small. Accordingly, no arc discharge occurs when the electrical wire 33 is removed from the terminal of the DC/DC converter 9. Also when another conductive member comes in contact with the terminal of the DC/DC converter 9 and the like, no arc discharge occurs.

In a state that the service plug 18, or the conductive member 37, is detached from the main body part 14, the first terminal 15 is connected to the second electrical connection box 12 which is connected to the high voltage battery 3 and others, and the second terminal 16 is connected to the DC/DC converter 9 which is left not used for a long time. In turn, electric power output from the high voltage battery 3 flows to the DC/DC converter 9, through the low conductive member 17. Accordingly, a current value of the electric power through the path between the high voltage battery 3 and the DC/DC converter 9, is small.

As a result, no arc discharge occurs when the terminal of the DC/DC converter 9 is connected to the second terminal 16. Further, no arc discharge occurs when the terminal of the second electrical connection box 12 coupled o the high voltage battery 3 and the electrical wire 27 coupled to the first terminal 15. Thus, no arc discharge occurs when the DC/DC converter 9 is connected to and disconnected from the second electrical connection box 12.

The terminal covering parts 41 are continuous to the second main body part 38. With provision of the terminal covering parts, it is prevented that when the conductive member 37 electrically interconnects the first terminal 15 and the second terminal 16, another conductive member comes in contact with the terminals 15 and 16. Further, it is prevented that another conductive member comes in contact with the terminals 15 and 16 when the electric power flows between the terminals 15 and 16. Therefore, it never happens that arc discharge occurs between the terminals 15 and 16 and the another conductive member.

As described above, in the first embodiment, the arc discharge preventing device 1 is disposed between the second electrical connection box 12 and the DC/DC converter 9 in the power supply system 2. If required, the arc discharge preventing devices 1 may be provided at squire boxes indicated by two dot chain lines in FIG. 7.

Specifically, the arc discharge preventing device 1 may be provided between the high voltage battery 3 and the second electrical connection box 12. The arc discharge preventing device 1 may be provided between the DC/DC converter 9 and the third electrical connection box 13. The arc discharge preventing device 1 may be provided between the low voltage battery 4 and the third electrical connection box 13.

In any of those cases, a current value of the electric power can be reduced in the path including the high voltage batteries 3, 12, 9 and 13 by removing the service plug 18 from the main body part 14 of the arc discharge preventing device 1 in a state that the power supply system 2 is operating or charge is stored in the DC/DC converter 9. No arc discharge occurs when the electric wire is removed from the terminal of any of the electronic devices 3, 12, 9 and 13, viz., when the high voltage batteries 3, 12, 9 and 13 are removed from the power supply system 2.

Before the high voltage battery 3 or the low voltage battery 4 is connected to the DC/DC converter 9 not storing charge, the service plug 18 is detached from the main body part 14 of the arc discharge preventing device 1. If so, when the DC/DC converter 9 and the batteries 3 and 4 are connected through the arc discharge preventing device 1, the electric power flowing through the path between the DC/DC converter 9 and batteries 3 and 4 flows through the low conductive member 17. A current value of the electric power can be reduced to be small in the path between the DC/DC converter 9 and the batteries 3 and 4. The arc discharge can be prevented when the electric wires are coupled to the DC/DC converter 9 and the batteries 3 and 4, viz., the DC/DC converter 9 and the batteries 3 and 4, are coupled to the power supply system 2.

An arc discharge preventing device 51 of a second embodiment according to the present invention will be described with reference to FIGS. 8 to 12. In those figures, like or equivalent portions will be designated by like reference numerals used in the figures referred to in the first embodiment. The arc discharge preventing device 51 of the instant embodiment is formed integral with the high voltage battery 3 as shown in FIGS. 8 to 11. As seen from FIG. 12, two arc discharge preventing devices 51 are contained in the power supply system 2.

As shown, the arc discharge preventing device 51 is provided between an electrode of positive polarity (positive electrode) of the high voltage battery 3 and another electrode of negative polarity (negative electrode) of the high voltage battery 3. The high voltage battery 3 includes a case 52 and a cell (battery cell), not shown, contained in the case 52, and positive and negative electrodes, both not shown.

The case 52 is made of insulating synthetic resin and shaped like a box. The cell has positive and negative polarities, and generates an electromotive force between those electrodes. The positive electrode of the cell is connected to the positive electrode terminal, and the negative electrode is connected to the negative electrode terminal.

Figure 11:
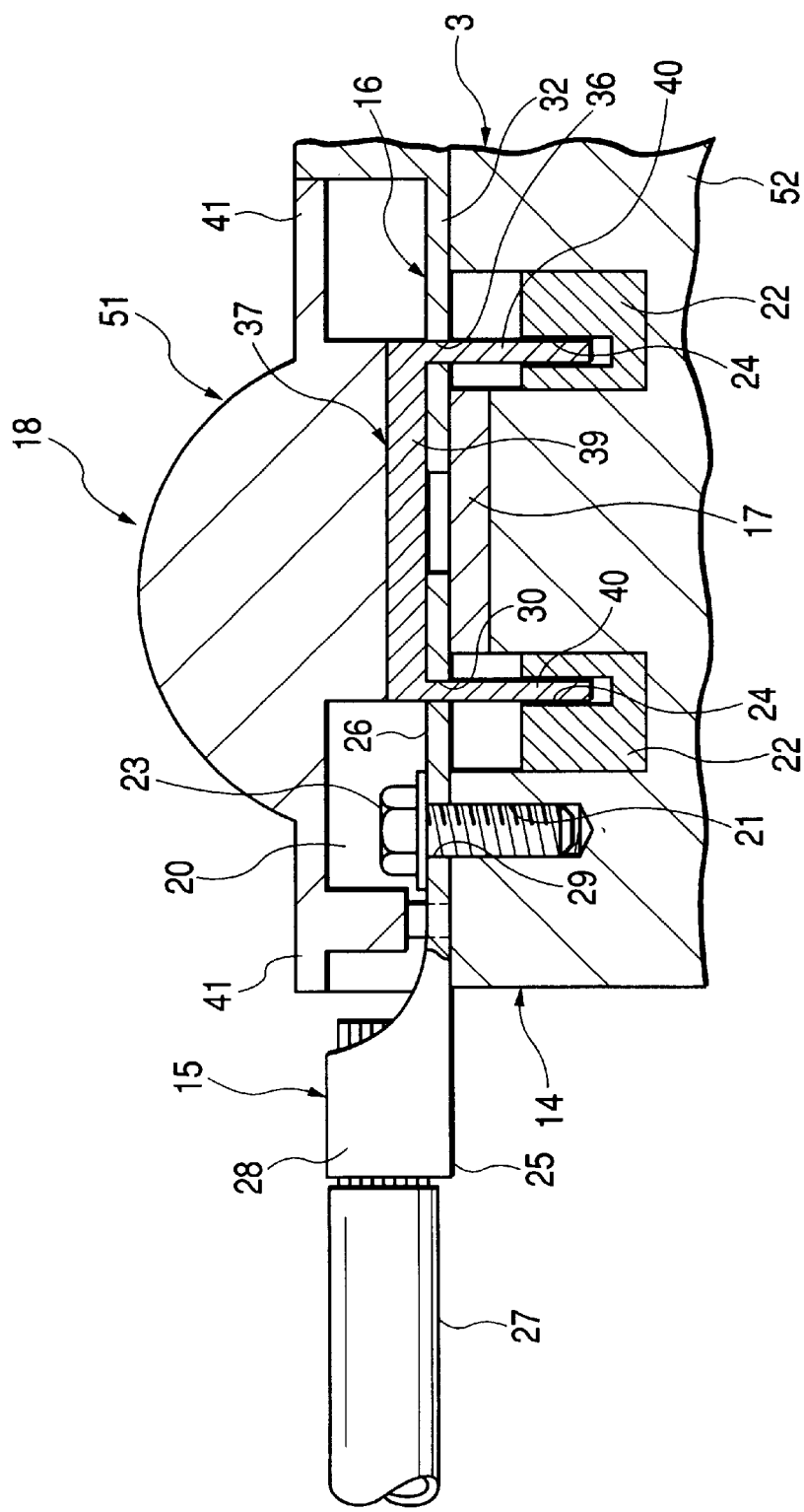
FIG. 11 is a cross sectional view taken on line XI—XI in FIG. 8.
Figure 12:
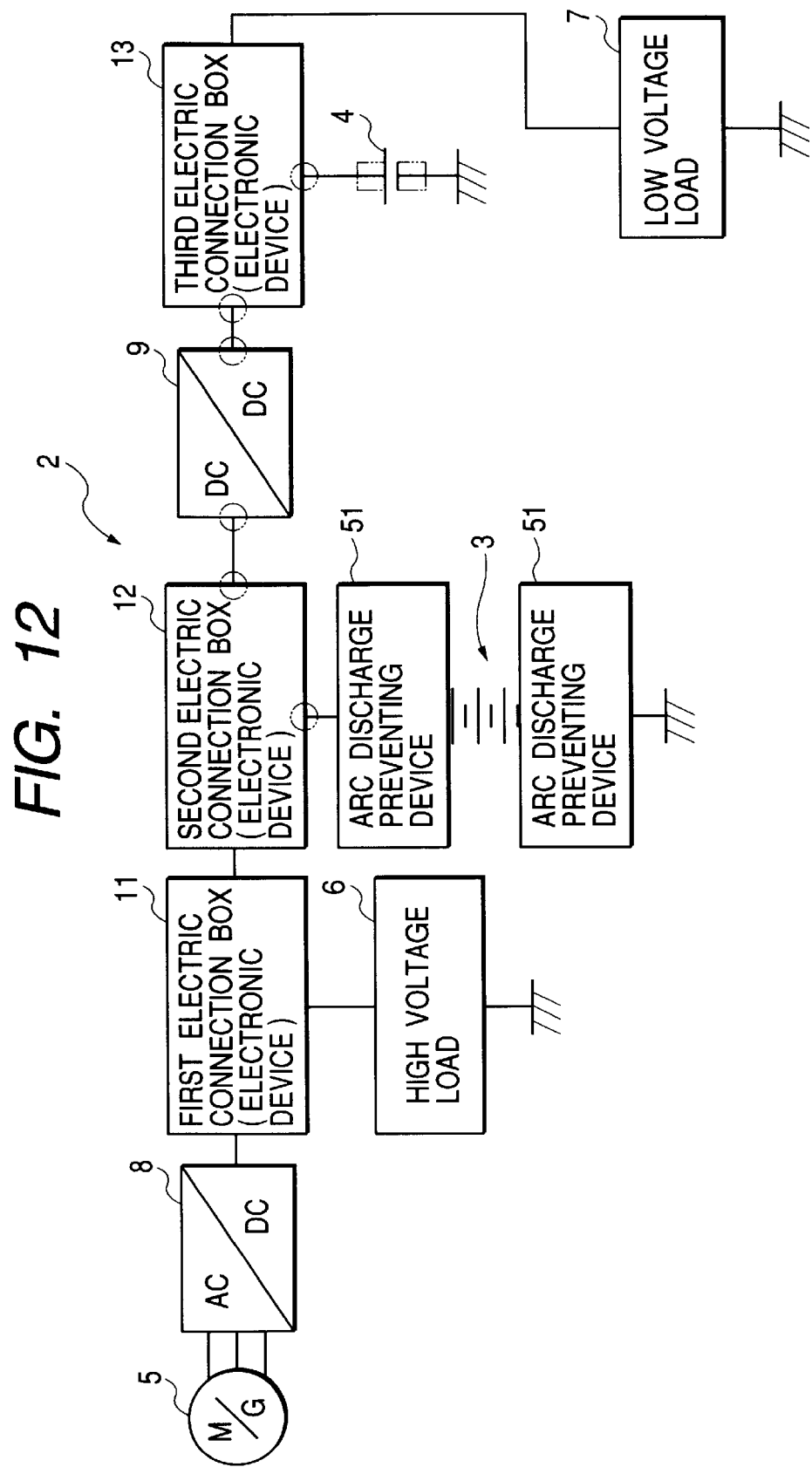
FIG. 12 is a block diagram showing a power supply system using the arc discharge preventing device shown in FIG. 8.
Figure 13:
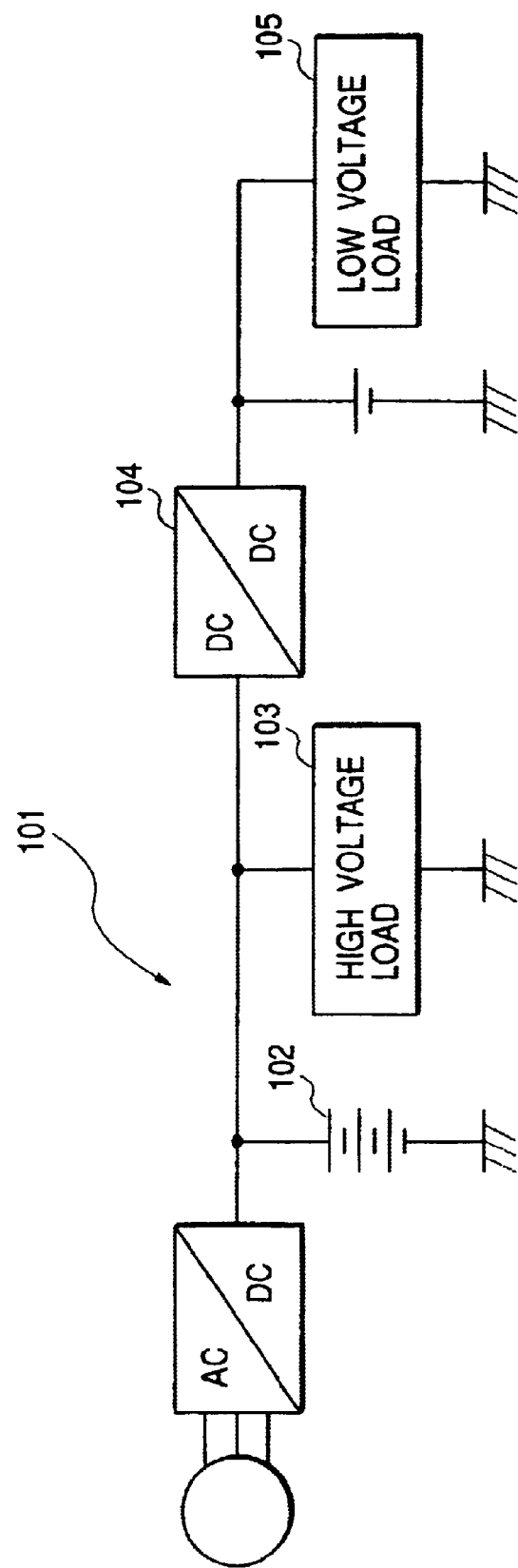
FIG. 13 is a block diagram showing a power supply system capable of supplying electric powers of multiple voltages.

In the arc discharge preventing device 51, as shown in FIG. 11 and others, the main body part 14 is formed integral with the case 52. In the arc discharge preventing device 51, which is connected to the positive electrode of the high voltage battery 3, the second terminal 16 is electrically connected to the positive polarity. The a16v is fixed to the main body part 14, or the case 52. The first terminal 15, as shown FIG. 12, is electrically connected to the second electrical connection box 12 through the electrical wire 27.

In the arc discharge preventing device 51, which is connected to the negative electrode of the high voltage battery 3, the second terminal 16 is electrically connected to the negative polarity. The second terminal 16 is connected to the main body part 14, or the case 52. The first terminal 15, as show in FIG. 12, is electrically connected to ground through the electrical wire 27. The "ground" is also involved in the electronic device.

Figure 9:
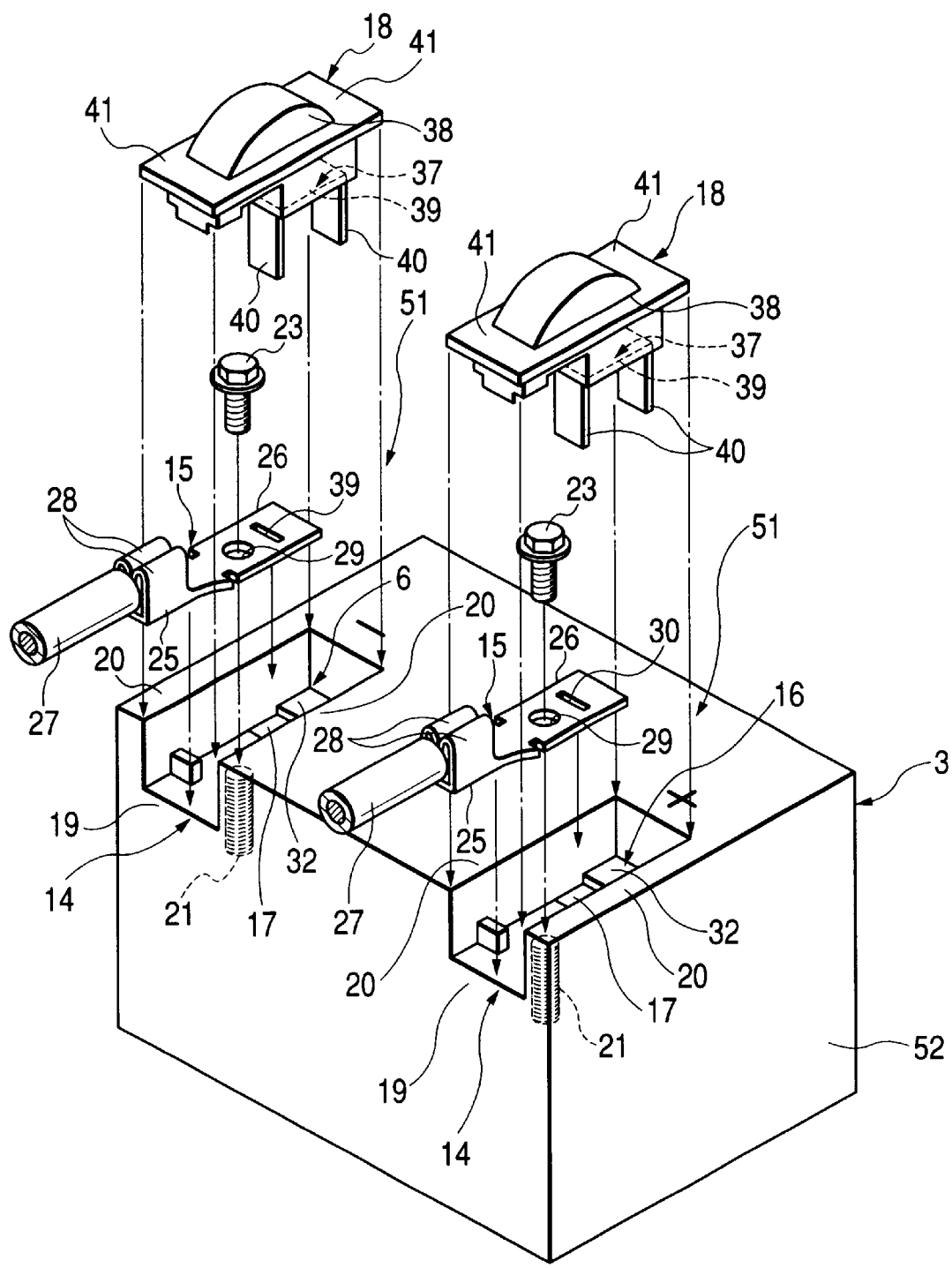
FIG. 9 is a perspective view showing, in exploded form, the arc discharge preventing device shown in FIG. 8.
Figure 10:
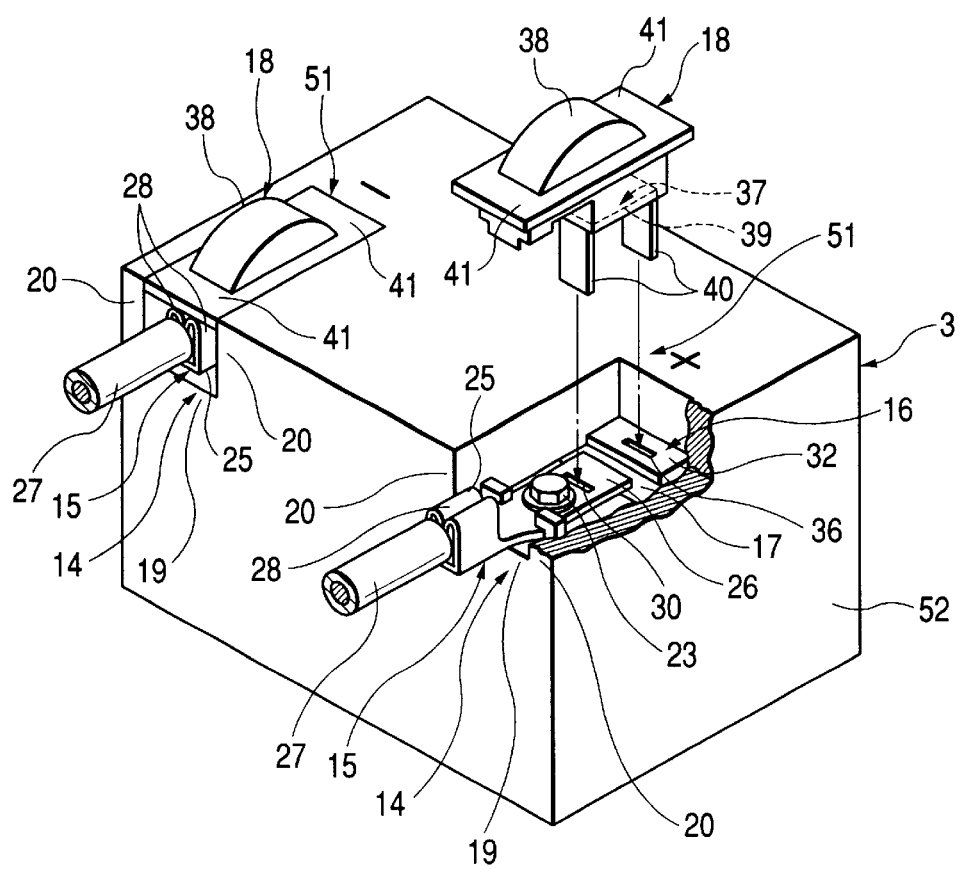
FIG. 10 is a perspective view showing a structure that a first terminal is mounted on the main body part of the arc discharge preventing device shown in FIG. 9.

In assembling the arc discharge preventing device 51 thus constructed, in a state of structure shown in FIG. 9, the first terminal 15 is mounted onto the main body part 14, or the case 52. Then, the service plug 18 is mounted on the main body part 14, or the case 52.

Also in the instant embodiment, a current value of the electric power is reduced in the path between the electronic devices 3 and 12 when the service plug 18 is removed from the main body part 14 of the arc discharge preventing device 51 in a state that the power supply system 2 is operating or charge is stored in the DC/DC converter 9. No arc discharge occurs when the electrical wire is removed from the terminal of the high voltage battery 3 or 12, viz., the high voltage battery 3 or 12 is removed from the power supply system 2.

Before the high voltage battery 3 is connected to the DC/DC converter 9 not storing charge, the service plug 18 is removed from the main body part 14 of the arc discharge preventing device 51. In this situation, if the DC/DC converter 9 is connected to the high voltage battery 3 through the arc discharge preventing device 51, the electric power flowing through the path between the DC/DC converter 9 and the high voltage battery 3 flows through the low conductive member 17.

In this connection, a current value of the electric power flowing through the path between the DC/DC converter 9 and the high voltage battery 3 is reduced. Accordingly, occurrence of arc discharge can be prevented when the electrical wire is connected to the DC/DC converter 9 and the terminal of the high voltage battery 3, viz., the DC/DC converter 9 and the high voltage battery 3 are connected to the power supply system 2.

In the second embodiment, the arc discharge preventing devices 51 are integrally assembled into the high voltage battery 3. If required, the arc discharge preventing devices may be provided at squire boxes indicated by two dot chain lines in FIG. 12. The arc discharge preventing devices 51 may be assembled integrally into the second electrical connection box 12, third electrical connection box 13 and the DC/DC converter 9, as indicated by circles of two-dot chain lines in FIG. 12.

Also in those cases, the arc discharge can be prevented from occurring by detaching the service plug 18 from the main body part 14 in a state that the power supply system 2 is operating, viz., charge is stored in the DC/DC converter 9. Further, the arc discharge occurrence is prevented by detaching the service plug 18 from the main body part 14 when the DC/DC converter 9 not storing charge is coupled to the power supply system 2.

What is claimed is:

1. An arc discharge preventing device which is electrically connected to at least two electronic devices, the arc discharge preventing device, comprising:

an insulating main body;

a first terminal, provided on the insulating main body, and electrically connected to a first electronic device;

a second terminal, provided on the insulating main body, and electrically connected to a second electronic device;

a low conductive member, provided on the insulating main body, and having a first resistance value, the low conductive member being electrically connected to the first and second terminals; and a conductive member, detachably mounted on the insulating main body, and having a second resistance value lower than the first resistance value, the conductive member being electrically connected to the first and second terminals when the conductive member is attached to the insulating main body.

2. The arc discharge preventing device as set forth in claim 1, further comprising an insulating second main body, detachably mounted on the main body, and on which the conductive member is mounted, wherein the second main body is provided with a covering part, which covers the first and second terminals in cooperation with the main body when the second main body is attached to the insulating main body so as to electrically connected the conductive member and the first and second terminals.

* * * * *